Patented July 29, 1952

2,605,205

UNITED STATES PATENT OFFICE 2,605,205

PROTECTIVE OVERLAY SHEETS AND PROCESS OF PREPARING SAME

Donald G. Patterson, Darien, and William F. Turner, Stamford, Conn., assignors to American Cyanamid Company, New York, N. Y., a corporation of Maine No Drawing. Application October 25, 1946, Serial No. 705,797

8 Claims. (Cl. 154—139)

This invention relates to transparent protective overlays and a process of preparing the same. More particularly, the invention is directed to durable, chemically-resistant, transparent overlay sheets for decoration laminates.

Protective decorative laminates are old; however the prior decorative laminae were of relatively light color, and the visibility of fibers in the protective substrata did not deter noticeably from the decorative features in the background. When dark backgrounds and natural grain woods were employed as the decorative laminae, the fibers of the substratum in the protective overlay were visible, detracting from the aesthetic appeal of the decorative laminae. Also, the resistance to abrasion, chemical action, and the like, is of particular importance due to present day uses of these decorative laminates. Accordingly, it is an object of this invention to prepare durable abrasion and chemical-resistant protective overlays having a degree of transparency not previously attained. It is a further object of this invention to provide a process of preparing transparent protective overlays. It is a still further object of this invention to prepare a resinous impregnated substratum which will yield a transparent protective overlay when subjected to heat and pressure.

The transparency of a cured resin impregnated overlay on a design which needs to be protected without obscurity is a difficult problem, because obscurity arises from scattered light which is manifest macroscopically. The light scattering is a complex phenomena, but it may be broadly classified as due to one of the several features: First, diffusion at an interface of a relatively large particle greater than 0.5 micron thick and a medium of different refractive index. In such instances, scattering takes place at various places for various reasons. For example, scattering may take place at the outside edges, and if the particle is smooth, solid, and geometrically shaped, this is the only location where scattering occurs. However, the particle may have irregularity of surface, and in such instances scattering takes place at the irregularities. Many natural fibers have internal canals, which give rise to light scattering, particularly when the internal canals are such that the medium does not completely replace the air in these canals. In such instances, the fiber is macroscopically visible, due to light scattering effected by the air entrapped in these internal canals. Other light scattering is due to other internal particles such as cracks in the resin, and the like. The other broad class of light scattering is effected by particles less than 0.5 micron thick. Other phases of this complex phenomena may be mentioned as scattering of reflected light at the very surfaces of the laminate due to scratches on the resin, or on the platen used to mold the resin-impregnated paper laminate, or due to crazing of the resin.

Besides the fact that the particles of the substratum may manifest their presence through light scattering, they may also give rise to interference phenomena which will produce colored effects both in diffuse light and in direct light. In the event that the fibers are thin, i. e., have thicknesses of the order of magnitude of the wave length (0.400 to 0.750 micron) involved in visible light and have a difference in index of refraction (relative to the medium) at one or more wave lengths in the visible spectrum, these interference effects may become important. They arise from the following sequence of events: the light enters the transparent medium and proceeds in a downward direction toward the substratum of fibers; there being supposed a difference of index of refraction between the medium and the fiber, a portion of the light will be reflected upward from the medium-fiber interface; the rest of the light will proceed on down into the fiber and encounter another partial reflection at the lower surface of the fiber; the portion reflected upwards will go through another partial reflection at the upper surface of the fiber; and the portion transmitted at the upper interface will now be travelling in the same direction as the portion which underwent the first reflection (this, of course, only in the event that the upper and lower surfaces of the film are parallel). If we confine our attention to one wave length, $\lambda$, and suppose that the refractive index of the fiber is greater than that of the medium at this wave length, we will observe maxima and minima of intensity (i. e., light and no light) from the interference of the two beams (the one reflected from the upper surface of the fiber, the other from the lower surface) when the path difference involved between the two beams is an odd or even number of half wave lengths of light (the wave length now being measured in the medium and equal to $\lambda$ air $\div n \lambda$ where $\lambda$ and $n$ designate wave length and refractive index, respectively.

When confining the attention to transparent overlays with fibrous substrata, the two most important phenomena mentioned above are the scattering of light by non-optically homogeneous fibers and by matrix-fiber interfaces where a refractive index difference (between that of the matrix and that of the fiber) exists at some wave length in the visible portion of the spectrum (0.400 to 0.750 $\mu$). The latter of these two will be treated first.

In order to cut down this interfacial scattering and reflection, it is important that a fairly good refractive index match be made between the fibers which form the substratum and the resin which forms the matrix. If possible, this match should be best in the region of the visible spectrum when the human eye has its maximum response in photopic vision (luminances greater than 100 microlamberts). This wave length is slightly greater than 0.550 and is in the yellow to yellow-green portion of the spectrum. In addition, it is more important that the refractive index match remain fairly good in the portion of the spectrum lying to the low wave-length side of this region of maximum sensitivity than it is for the match to be good in that portion of the spectrum lying to the high wave length side of the region of maximum sensitivity. If the fibers are perfectly smooth, if optical contact be made between the fiber and resin, and if the fibers are macroscopic and not microscopic in dimensions, then the specular reflections which occur at the fiber matrix interfaces will be more important than scattering. On the other hand, if the fibers have surface irregularities which prevent the achievements of optical contact between the fibers and the resin, the effects of scattering will be predominant. Likewise, for smooth fibers, a refractive index difference between fibers and matrix will produce just as much specular reflection at one wave length as at another; but for fibers with surface irregularities not in optical contact with the resin, the scattering will be more pronounced for a given refractive index difference at shorter wave length than is the case at longer wave length.

As is well known, it is possible to vary the refractive index of the medium surrounding an object so as to make the object become visible when an exact refractive index match is obtained at the wave length of light used for examining the fiber. However, with white light, the fiber will again become visible because the dispersion curves of the fiber and the surrounding material do not, in general, match one another. By the use of the microscope, the refractive index of an optically isotropic fiber can be matched to within 0.003 unit of index with monochromatic light and to within 0.001 unit of index using white light. (This means that an index difference this small is measurable, and detectable.) However, in transparent resin overlays provided with a fiber substratum, a bigger index difference can be tolerated without having the fibers become visible because they are no longer examined by transmitted light but are viewed against an opaque background. For this reason, as will be shown by the examples, a refractive index difference between fibers and resin as large as 0.25 unit (at any wave length) may be tolerated without having the fibers become easily visible when viewed against an opaque background provided they have smooth surfaces, are optically homogeneous, and are in optical contact with the resin. This is virtually impossible with natural fibers which have been used by others for forming a mat sub-surface which is then impregnated with the resin, because such natural fibers in general do not exhibit smooth surfaces and, in addition, almost always contain capillaries (which once functioned as conductors of vital fluids but later, when dried, contain air (which cannot be filled with the resin and therefore scatter light because of the fiber-air interface. In short, natural fibers are not satisfactory because it is almost impossible to make them optically homogeneous.

Cellulose fibers whether naturally occurring or fabricated from regenerated cellulose are relatively close in their light scattering effects in the same resinous medium. There is, therefore, little difference among them as chemical materials for filler in an overlay. There are differences, however, in physical structure, such as grooves, twists, capillaries, bubbles, etc.

Synthetic fibers, are solid in cross section and can be made smooth and round, which is an optical advantage. They are preferable as the substrata or paper for resin impregnated transparent plastic overlays. However, synthetic fibers do not felt very easily, and usually require some natural fibers to aid in the formation of a layer strong enough to be used on standard paper machines. When a natural fiber is employed, as is practically always necessary with synthetic fibers, it is desirable to select one free of irregularities of surface, internal canals and internal particles as possible; and, in felting or weaving the paper to be employed as a substratum, care should be exercised to effect as uniform distribution of fibers as possible, to avoid scattering of light by too many interfaces. It is preferable to have the fibres as nearly horizontally oriented with respect to the substratum plane surface as possible.

There are several other factors which have an effect on the transparency and visibility of fibers in these transparent protective overlays. For example, when a paper having a small percentage of natural fibers is employed, care should be taken in the impregnation of the paper to completely fill all irregularities, capillaries, and the like with the resin, otherwise entrapped air will result in the cured article giving light scattering, rendering the fibers visible. The refractive indices of the fibers in the substrata and that of the impregnating resin should be relatively similar, although slight variances are not noticeable in the final product. Satisfactory results have been obtained with substrata comprising fibers of refractive index between 1.450 and 1.700, and impregnating resins having a refractive index of 1.530 to 1.680 in the cured resin.

In order to more specifically described the invention, the following examples are given by way of illustration, and are not to be construed as limitations thereon.

*Example 1*

A felted 4 mil paper composed of approximately 90% viscose rayon fibers and 10% grass fibers was satisfactorily employed as a substratum for transparent plastic overlays; the average refractive index of the viscose fibers being 1.544, and of the grass, 1.567. The fibers employed in the felting of this paper were relatively uniform in size, and felted to give a paper of substantially uniform distribution and density. This paper was impregnated with a melamine formaldehyde resin solution, the solvent comprising 70% ethyl alcohol and 30% water. The cured resin employed had a refractive index of 1.652. The paper sheet impregnated with this resin in the particular solvent was void of air when impregnated, pressed and cured. The sheets were then dried to remove the solvent and partially polymerize the resin. An analysis indicated the resin content of the sheet to be approximately 70%, based on the total weight of paper and resin. This resin impregnated overlay paper was placed on a jet black decorative sheet, assembled with core material, and pressed for approximately 30 minutes at 135° C. temperature, and 1000 to 1500 p. s. i. pressure. The press was cooled to approximately 30° C., and the laminate removed. A clear black product having a glossy, transparent surface was obtained. The transparent overlay was not affected by pouring boiling water on the surface and allowing a container of hot water to rest on the moist surface. It was also highly abrasion-resistant.

*Example 2*

The procedure of Example 1 was repeated using two sheets of the impregnated 4 mil paper to form a thicker protective overlay. The laminate obtained in this manner was clear black, with none of the fibers in the transparent overlay being visible; the appearance and gloss being substantially the same as that obtained with one ply overlay.

The above experiments were repeated with both the four mil single ply, and the eight mil double ply, as overlays on various laminate bases; for example, printed decorative sheets, pigmented and unpigmented sheets. All yielded excellent products having high gloss, transparency, and macroscopic invisibility of fibers in the protective overlay.

This same substratum, 90% viscose rayon fibers and 10% grass fibers, was wet-strength treated with a standard regenerated cellulose composition and impregnated with an aqueous solution of the melamine-formaldehyde resin. Transparent plastic overlays of this material were comparable to those obtained with the substratum not treated with wet-strength composition, but impregnated with an aqueous-alcohol solution of the resin.

Other substrata which were satisfactorily employed according to the procedure outlined in the above example, were a paper comprising approximately 50% viscose rayon fibers and 50% sulfite coniferous pulp distributed uniformly throughout the paper. This paper was approximately 1 mil in thickness and had an index of refraction of 1.549 for white light. Accordingly, several of the sheets were laminated to give protective overlays of desired thickness. The fibers in this paper were of uniform cross-section and distribution. Also, felted sheets of jute fibers having a refractive index of 1.555 for white light were made in varying thicknesses from 3 to 7 mils from jute fibers of uniform cross-sectional dimension distributed uniformly and in horizontal orientation. Several woven substrata likewise gave excellent results. For example, a woven viscose rayon cloth of fine denier fibers functioned excellently as a substratum for the transparent plastic overlays when impregnated with solutions of melamine formaldehyde resins.

Other resins which were found to be satisfactory were a melamine formaldehyde resin prepared by reacting 2 mols of formaldehyde per mol of melamine, and kettle-drying to obtain a white solid which was water-soluble. This resin had a refractive index of 1.671. A similar resin was prepared by reacting 3 mols of formaldehyde per mol of melamine to give a resin having a refractive index of 1.655. A spray dried melamine-formaldehyde resin, prepared by spray drying a syrup obtained by reacting 2 mols of formaldehyde with each mol of melamine had a refractive index of 1.652. A melamine formaldehyde syrup obtained by reacting between two and three mols of formaldehyde per mol of melamine and buffering with paratoluene sulfonic acid was useable in syrup form, and had a refractive index of 1.642 in the cured state. Mixed resins prepared by reacting melamine and urea with formaldehyde had refractive indices from 1.602 to 1.606. Other resins prepared from urea and formaldehyde had refractive indices from 1.565 to 1.607. Alkyd resins, and styrene copolymerized with alkyd resins, having refractive indices from 1.544 to 1.554, were satisfactorily employed as impregnating resin. Copolymeric resin of styrene and acid-modified glycol-fumaric alkyds were particularly good as impregnating resins. Copolymeric resins of diallyl phthalate and various alkyd resins, particularly glycol-fumaric alkyds, were also good as impregnating resins.

*Example 3*

An overlay was prepared employing a 1 mil felted sheet of jute fibers uniformly distributed. The average refractive index of this paper was 1.555. The paper was impregnated with an unsaturated polyester resin prepared by reacting 6½ parts of a mixture of 3½ mols ethylene glycol and 3 mols diethylene glycol with approximately 6 parts of a mixture of 2 mols fumaric acid and 1 mol phthalic anhydride. This reaction product was copolymerized with approximately ½ its weight of styrene, having 1% benzoyl peroxide as a catalyst. The impregnation was effected by conventional dip-tank and squeeze roll method to provide a sheet containing approximately 70% resin. Laminates were prepared by building up several plys of impregnated Kraft paper to give the desired thickness, and a decorative sheet of paper and pigmented paper sheets were placed on top of these backing laminae. The impregnated protective sheets were placed over the decorative sheets and the various laminates were cured at 50 p. s. i. pressure, and 105° C. for 30 minutes. In all cases products were obtained which had excellent gloss, appearance, abrasion and chemical-resistant surfaces, and transparency to a degree that the fibers of the protective overlay were macroscopically invisible.

*Example 4*

A plywood laminate was prepared by building up several plies of wood veneers into a standard plywood core, and a smooth sanded wood veneer was placed on the top thereof as a decorative lamina. This veneer plywood was then spread with a thin film of an unsaturated alkyd resin of the type described in Example 3. A 4 mil paper of uniform fiber distribution and density felted from approximately 90% viscose rayon fibers and 10% grass fibers having an average refractive index of the mixture of 1.549, was smoothed onto the coated panel and the resin was allowed to penetrate through the sheet in all areas. When this had been accomplished, an additional quantity of resin of resin was then spread in a thin layer on the sheet. This assembly was heated for approximately 12 minutes at 200° F., after which the assembly was pressed with the resin impregnated paper against a smooth, glossy metallic plate. The pressing conditions were approximately 100 p. s. i. pressure at a temperature of 105° C. for approximately 15 minutes. The final product exhibited gloss with a transparency to such a degree that the grain of the wood appeared natural and the fibers were macroscopically invisible.

We claim:

1. A protective overlay sheet for decorative laminates comprising a thermosetting synthetic melamine-formaldehyde resin and a fibrous substratum of uniform density and having 50-90% synthetic resinous fibers impregnated with said resin, said resin and substratum being separately optically homogeneous and said resin and substratum being substantially in optical contact with one another and said resin-impregnated substratum being rendered clear and transparent when subjected to heat and pressure.

2. A protective overlay sheet for decorative laminates comprising a thermosetting synthetic melamine-formaldehyde resin and having a refractive index in the cured state of from about 1.530-1.680, and a fibrous resin impregnated substratum of uniform density comprising fibers having refractive indices between about 1.450-1.700 and having 50-90% synthetic resinous fibers, sad resin and substratum being separately optically homogeneous and said resin and substratum being substantially in optical contact with one another, and said resin-impregnated substratum being rendered clear and transparent when subjected to heat and pressure.

3. A protective overlay sheet for decorative laminates comprising a thermosetting melamine-formaldehyde resin and a fibrous substratum of uniform density having 50-90% synthetic resinous fibers impregnated with said resin, the refractive index of said substratum and said resin being approximately the same, and same resin-impregnated substratum yielding a clear and transparent sheet on the application of heat and pressure, wherein said resin and substratum are separately optically homogeneous and said resin and substratum are in optical contact with one another.

4. A clear protective overlay sheet for decorative laminates comprising a melamine-formaldehyde resin, a fibrous substratum of uniform density comprising viscose rayon fibers and grass fibers, wherein the rayon fibers constitute 50-90% of the total weight of the fibers present and said substratum being impregnated with said resin, wherein said resin and substratum are separately optically homogeneous and said resin and substratum are in optical contact with one another.

5. A laminate comprising a decorative lamina and a protective sheet positioned thereover, said protective sheet comprising a thermosetting melamine-formaldehyde resin and a fibrous substratum of uniform density impregnated with said resin, having 50-90% synthetic resinous fibers, said resin and substratum being separately optically homogeneous and said resin and substratum being in optical contact with one another, and said resin-impregnated substratum being bonded to said lamina upon the application of heat and pressure and being rendered clear and transparent thereby.

6. A process for preparing a protective overlay sheet for decorative laminates which will be clear and transparent when subjected to heat and pressure, comprising impregnating a fibrous substratum of uniform density having 50-90% synthetic resinous fibers, with a clear thermosetting melamine-formaldehyde resin, wherein said resin and substratum are separately optically homogeneous and said resin and substratum are in optical contact with one another.

7. A process for preparing a protective overlay sheet for decorative laminates capable of being bonded thereto and rendered transparent upon the application of heat and pressure, comprising impregnating a fibrous substratum of uniform density having fibers of a refractive index from about 1.450-1.700, having 50-90% synthetic resinous fibers, with a thermosetting melamine-formaldehyde resin having a refractive index from about 1.530-1.680 when cured, wherein said resin and substratum are separately optically homogeneous and said resin and substratum are in optical contact with one another.

8. A process for preparing a decorative laminate having a clear and transparent protective overlay sheet, comprising impregnating a fibrous substratum of uniform density, having 50-90% synthetic resinous fibers, with a clear thermosetting melamine-formaldehyde resin, placing said resin-impregnated substratum in superimposed relationship with a decorative lamina and applying heat and pressure to form a clear, transparent, decorative laminate, wherein said resin and substratum are separately optically homogeneous and said resin and substratum are in optical contact with one another.

DONALD G. PATTERSON.
WILLIAM F. TURNER.

REFERENCES CITED

The following references are of record in the file of this patent:

UNITED STATES PATENTS

| Number | Name | Date |
|---|---|---|
| 138,302 | Wagner | Apr. 29, 1873 |
| 217,604 | Francis | July 15, 1879 |
| 1,454,845 | Clay | May 15, 1923 |
| 1,597,539 | Novotny et al. | Aug. 24, 1926 |
| 1,961,105 | Huber | May 29, 1934 |
| 2,064,292 | Charch | Dec. 15, 1936 |
| 2,084,081 | Faber | June 15, 1937 |
| 2,108,807 | Finzel et al. | Feb. 22, 1938 |
| 2,176,837 | Ellis | Oct. 17, 1939 |
| 2,197,357 | Widmer | Apr. 16, 1940 |
| 2,281,635 | Strauss | May 5, 1942 |
| 2,311,613 | Slayter | Feb. 16, 1943 |
| 2,332,373 | Dorough et al. | Oct. 19, 1943 |
| 2,432,542 | Pitzl | Dec. 16, 1947 |
| 2,439,929 | Hill | Apr. 20, 1948 |
| 2,477,000 | Osborne | June 26, 1949 |
| 2,496,665 | Hermanson | Feb. 7, 1950 |